Patented Mar. 15, 1938

2,111,049

UNITED STATES PATENT OFFICE 2,111,049

PROCESS OF OBTAINING HIGHLY PURIFIED VITAMIN A

Harry N. Holmes, Oberlin, Ohio, assignor to Parke, Davis & Company, Detroit, Mich., a corporation of Michigan No Drawing. Application March 9, 1934,
Serial No. 714,843

4 Claims. (Cl. 167—81)

The invention relates to vitamin substances and the methods and materials used in obtaining the same. More particularly, the invention is concerned with the isolation of vitamins and like organic substances of a labile or easily oxidizable nature in a state of high purity or concentration and special adsorbing materials of an ultra porous nature for use in said isolation.

It is known that animal oils, such as fish liver oils, contain vitamins and vitamin-like substances and that they may be concentrated by saponifying the oil, freezing out or otherwise removing sterols and other impurities from the non-saponifiable fraction, and finally subjecting the liquid concentrate to a further concentration by the use of various methods. However, the further purification of the liquid concentrate is very difficult, not only because of the small amounts of material remaining, relative to that started with, but because of the instability of the vitamins and the great difficulty of removing the last interfering amounts of impurities. This is especially the case when trying to obtain pure vitamin A from its concentrates or concentrated solutions. It appears that the combination of impurities from animal sources with vitamin A from such sources is entirely different from the combination of plant or vegetable impurities with plant substances having a physiological activity similar to that of vitamin A. For instance, it has been possible to concentrate the carotene of plants and in some cases to isolate it from associated impurities in a state of high purity. In this isolation the carotene has been separated from other associated substances of a very similar nature chemically and physiologically. However, when the methods heretofore used to isolate carotene and similar compounds from vegetable sources are applied to animal products containing vitamin-like substances, and especially to oils containing vitamin A, such methods have been found incapable of isolating the desired physiologically active substance in a state of very high purity or in the substantially chemically pure form.

It is an object of this invention to obtain vitamins in a state of very high purity and to provide a general method for the separation of vitamins and like substances of a labile or easily oxidizable nature from those naturally occurring substances associated therewith.

A further object is to provide a method especially suited to the concentration and isolation of vitamin A from animal sources, such as fish liver oils.

Another object is to furnish new adsorbing agents having an ultra porosity especially suited for adsorbing labile or easily oxidizable vitamins and which will not at the same time cause the destruction of the vitamins adsorbed thereon, but will liberate them substantially unchanged when treated with the proper solvents or other desorbing agents.

These and other desirable objects may be realized by my invention which may be understood and illustrated by a consideration of the following examples.

METHOD OF PURIFICATION

Approximately two liters of ordinary halibut liver oil were saponified and the non-saponifiable portion removed from the soap by extraction with ether. The ether was removed by evaporation to give the non-saponifiable residue. From this point on, oxygen of the air was carefully excluded throughout the entire process. The non-saponifiable residue containing practically all the vitamin A of the liver oil was dissolved in alcohol and cooled to a temperature and for a time suitable to the freezing out of cholesterol. The cholesterol was then filtered off, the filtrate cooled to a lower temperature and more cholesterol and impurities frozen out and filtered off. A convenient amount of pentane was then added to the alcoholic filtrate and finally water added to force the vitamin A with some impurities into the separate layer of pentane. The pentane layer was then removed, cooled down to the temperature of solid carbon dioxide and filtered in at atmosphere of nitrogen. The filtration was carried out in a heavy strong metallic ultrafilter suited to high pressures using nitrogen (or other inert gas) and immersing the filter in carbon dioxide snow or other suitable refrigerating agent.

After filtering the cooled pentane solution it was put through a Tswett column. (See "Carotenoids and Related Pigments" by Palmer, pages 43 and 226, published in 1922 by Chem. Catalog Co.) (See also Chromatographic Analysis, Ber. deut. botan. Ges. 24: 384, 1906.)

The Tswett column consisted essentially of a vertical glass adsorption tube open at both ends, about 1½ inches in inside diameter and about 30 inches in length, the lower 5 or 6 inches of which tapered off sharply to a tube of diameter of about ½ inch. The lower portion passed through a stopper fitting in an air tight manner into a filter flask having a side arm near its top which was connected by a rubber tubing to a dropping funnel fitted through a stopper into the open end of the top of the adsorption tube.

This arrangement of the rubber tubing served to equalize the pressure of nitrogen gas and pentane vapors above the liquid in the dropping funnel at the top and above that in the receiving or filter flask at the bottom of the adsorption tube.

At the bottom of the wider section of the column at the point where it began to taper to a smaller diameter a plug of glass wool was placed sufficient merely to sustain the adsorbent to be placed in the column. The entire adsorption column and its connections were made gas tight and contained only inert nitrogen gas and vapors of pentane. The adsorbent used was my specially prepared ultra porous activated carbon. Its preparation and properties are described below under Example 1.

The active carbon, kept free from oxygen, was agitated with pentane and poured into the column while excluding all air or other source of oxygen. Enough carbon was used to form a layer about 9 or 10 inches deep in the column. After the carbon had settled the pentane was allowed to drain into the filter flask until the pentane level in the glass column was only an inch or so above the top of the column of adsorbent carbon. A convenient quantity of the pentane solution of vitamin A obtained as above described was then put in the dropping funnel and run into the adsorption column. The solution of vitamin A was then followed by pure solvent, such as pentane, added from above in the same manner. The subsequent additions of pure solvent served to wash vitamin A and impurities, previously adsorbed by the carbon, on down through the carbon and finally out the lower end and into the receiving flask or flasks filled with nitrogen. However, the difference in adsorptive power of my active and ultra porous carbon for vitamin A and that for impurities associated with vitamin A was so great that the filtrate, collected in fractions, became richer and richer in vitamin A and finally diminished in potency. Thanks to the exceptional properties of my adsorbent, a separation of vitamin A from impurities was thus possible. During absorption the most strongly adsorbed material was of course caught near the top of the carbon layer. The less strongly adsorbed was carried farther down. With excess pure wash liquid the adsorption equilibria were all disturbed by the mass action of the solvent and the bands of vitamin A as well as bands of impurities were steadily pushed down and out at the bottom of the tube.

If a further purification is desired, the various fractions may be put through the adsorption column again or any number of times in addition.

The various fractions, after evaporating off the pentane, were tested for vitamin A potency by the well known antimony trichloride color test. These tests indicated an average potency for the strongest fractions of about 4,000,000 to 6,000,000 U. S. P. cod liver oil units of vitamin A per gram. By using my special adsorbents, illustrated below under Examples 2 and 3, and starting with halibut liver oil, I have readily obtained vitamin A concentrates in the form of very clear light yellow oils testing 5,500,000 to 6,000,000 U. S. P. cod liver oil units of A per gram and as high as 7,200,000 of such units per gram. These figures for potency were checked by the bio-assay method, and their extremely high values are emphasized by comparison with ordinary medicinal cod liver oil of about 500 U. S. P. units per gram.

The extremely high potency of my most purified and concentrated products indicates that I have obtained substantially pure vitamin A. Also in support of this is the fact that I have actually crystallized such products and, although the crystals melt at an extremely low temperature and their preservation in solid form is somewhat difficult, I have been able to obtain them and have observed that they are in the form of long needlelike crystals melting at low temperatures at least in the presence of the oil from which they are crystallized. The crystals apparently belong to the monoclinic system.

In the step of crystallizing the vitamin A concentrate, I take the pentane solution as it comes from the Tswett column, surround the container for the solution with a low temperature refrigerant, such as carbon dioxide snow, and connect the container for the vitamin concentrate by a delivery tube with a greatly cooled vessel containing nitrogen or other inert gas and activated carbon or other suitable porous solid which will adsorb the vapors of the solvent (pentane, for example). The rate at which the solvent is adsorbed will depend upon the temperature of the adsorbent, the adsorption being faster at lower temperatures. By such an arrangement, I am able to increase the temperature of the pentane adsorbent and thus slow up the rate at which pentane is drawn over from the concentrate near its point of supersaturation. This slowing up of evaporation of solvent near the point of crystallization acts to produce crystals of larger size, since more time is given in which crystals may form.

If crystallization does not occur readily, it may be necessary to refrigerate to a lower temperature or carry the evaporation of solvent further, or both of these procedures may be needed.

When I have carried the cooling and evaporation of solvent far enough to obtain a suitable amount of crystals, the latter are separated from mother liquor or uncrystallized vitamin A by straining or centrifuging or filtering quickly and in general by any known method, always however, keeping in mind that such operation must be conducted at very low temperatures, since the slightest rise in temperature is frequently sufficient to increase the solubility of the crystals in their solvent to such a point that very few of them are finally retrieved. I have found it useful to use an inert porous solid, such as porcelain or even more highly porous materials, to take up the liquid clinging to the virtually colorless or slightly yellow appearing crystals. The crystals are then mechanically removed from the porous material and allowed to melt to pure oil, which is their normal condition. Although the first crystals of vitamin A obtained by my process are shown by assay to be substantially pure vitamin A, when the adsorption and desorption in the column has been carried out efficiently, they may on the other hand require further purification. In such case, I may take original crystals and recrystallize them from suitable liquids such as methyl alcohol, dichloromethane, ethyl formate, ethyl iodide, chloroform, ethyl alcohol, acetone, etc. I may also use these liquids for dissolving any batch of crystals, at any point in the purification beyond the use of the column of adsorbent, and even for the oily concentrate obtained from the column. Crystals are produced from such solutions by the same method as already described. Rigid exclusion of air or oxygen should of course be practised at every point in the purification and is particularly essential when passing the solution in pentane or other suitable solvent through the column of adsorbent. This will be brought out by considering Examples 1 and 2, wherein exclusion of oxygen is also an essential feature.

PREPARATION OF SPECIAL ULTRA POROUS ADSORBENTS

*Example 1.—Highly adsorptive carbon*

The starting material for this example was a very fine commercial carbon known as "Norit" which contained considerable adsorbed air. A quantity of this carbon was placed in a suitable container provided with a cover which fit loosely enough to permit access of some air. Under such conditions the carbon was rapidly raised in temperature to approximately 900 or 1000° C., held at this temperature momentarily and then the container and its contents quickly removed from the heat and placed in a much larger unheated container filled with nitrogen. The cooling in nitrogen may also be conveniently managed by allowing a stream of nitrogen to pass over the surface of the carbon while cooling. The carbon so activated and cooled was run through a 200 mesh sieve, which passed most of it. This operation was also conducted in an atmosphere of nitrogen. The carbon may be given further porosity by raising the temperature to 900 to 1000° C. and allowing it to cool in the presence of air in the furnace, then again raising to 900 to 1000° C. in air, and cooling in nitrogen as previously described. After the carbon had passed through the sieve, as above described, it was used in the adsorption column.

A very important difference exists between my ultra porous active carbon given a final heating in the presence of limited amounts of oxygen and cooled and maintained in a non-oxidizing atmosphere and the active carbon obtained in a similar manner but with air cooling or cooling in the presence of an oxidizing atmosphere. The best result obtained with the latter in the Tswett adsorption column was a concentrate assaying around 3,500,000 U. S. P. cod liver oil units, whereas my carbon with pores filled with nitrogen gave a concentrate with an assay around 7,000,000 U. S. P. units. Although I do not wish to limit the invention in any way by my opinion as to what the causes of such differences are, I believe they are due chiefly to the pores of my carbon being practically entirely free from oxygen and containing gas inert to vitamin A and similar labile substances. Furthermore, it appears that the carbon cooled in air would contain oxygen which, due largely to the catalyzing influence of the carbon itself, would immediately cause oxidation or change in any vitamin-like materials adsorbed thereon to form tarry or other substances having a tendency to clog up the pores or otherwise interfere with the adsorptive power of the active surfaces.

*Example 2.—Ultra porous magnesia*

A quantity of a commercial magnesium hydroxide in the form of "milk of magnesia" was filtered and water removed by pressure of nitrogen above the suspension on the filter. The partly dried magnesia cake having its pores filled with nitrogen was further dried by heating around 200° C. in the presence of nitrogen, while excluding air or oxygen. The dried product was then pulverized with exclusion of air and heated again in a stream of nitrogen. The final dried magnesium oxide was run through an 80 mesh sieve and then through a 150 mesh sieve.

The exact temperature used for heating the magnesia may be varied somewhat depending upon the other conditions but should always be below that at which the walls of the capillarities sinter and collapse. The rate of dehydration must be slow enough to yield an effective internal structure or porosity for the individual particles.

This new kind of magnesia was found to be ultra porous in nature and extremely efficient in adsorbing and separating vitamin A from its impurities in the Tswett column previously described. Its adsorptive properties were found to be far superior to that of ordinary magnesia as prepared by calcining magnesium carbonate to a temperature sufficient to drive off carbon dioxide. A quantity of magnesia made by this calcining method was used in the Tswett column as previously described, but with such very poor results that it must be concluded that the particles thereof do not have enough surface for effective adsorption and separation of vitamin A and similar substances from associated impurities by specific or preferential adsorption.

The hydrated magnesia used may be milk of magnesia or any other equivalent finely divided magnesia in a state of partial or even complete hydration. Ordinary precipitated magnesia may be used.

A very essential feature of my new adsorbents whether carbon, magnesia or other equivalent adsorbent similarly prepared, is that their pores or capillarities are not only of the optimum size and condition for ultra adsorption, but when used to adsorb vitamins, carotene and other like labile substances are practically entirely free from oxygen.

What I claim as my invention is:

1. Process for the purification of an impure vitamin A product from a fish liver oil, which has had cholesterol and similar impurities separated from it, comprising passing a solution of said product and associated impurities in a low boiling inert hydrocarbon liquid through a layer of an ultra porous adsorbent of the class comprising carbon and magnesia, the pores of which adsorbents are substantially entirely free of oxidizing gases and which adsorbent is capable of preferentially adsorbing the vitamin A and its impurities to cause an effective separation thereof within the adsorbent and separately displacing vitamin A and impurities through said layer by passing a desorbing solvent through the layer and collecting fractions of the solution passing through having a higher ratio of vitamin A to impurities than the original solution and removing solvent from the purified solution of vitamin A.

2. Process for the purification of an impure vitamin A product from a fish liver oil which comprises saponifying the liver oil, separating the non-saponifiable fraction containing vitamin A, removing cholesterol and similar impurities therefrom, dissolving the vitamin A containing residue in pentane in an inert atmosphere, passing the pentane solution through a layer of an ultra porous adsorbent of the class comprising carbon and magnesia, the pores of which adsorbents are substantially entirely free of oxidizing gases and which adsorbent is capable of preferentially adsorbing the vitamin A and its impurities to cause an effective separation thereof within the adsorbent, and separately displacing vitamin A and impurities through said layer by passing a desorbing solvent through the layer and collecting fractions of the solution passing through having a higher ratio of vitamin A to impurities than the original solution passed through and repeating the adsorption and desorption with the collected fractions until substantially pure vitamin A in pure solvent is obtained and removing the solvent.

3. Process for the production of substantially pure vitamin A which comprises removing cholesterol and similar impurities from the non-saponifiable fraction of a fish liver oil containing vitamin A, dissolving the residue containing vitamin A in a low-boiling inert hydrocarbon liquid and, in an inert atmosphere, alternatively and preferentially adsorbing the vitamin A from impurities on an ultra-porous adsorbent, the pores of which are free from oxidizing gases, and desorbing the vitamin A until a highly purified vitamin A in pure solvent remains, and removing the solvent.

4. In a process for the production of highly purified vitamin A products the steps comprising alternatively treating in an inert atmosphere a solution of an impure vitamin A composition, from which cholesterol and similar impurities have been removed, in a low-boiling inert hydrocarbon liquid with an ultra-porous adsorbent, the pores of which are free from oxidizing gases, to first adsorb the vitamin A from impurities and then desorb it to thereby obtain a solution of highly purified vitamin A.

HARRY N. HOLMES.